United States Patent
Vendrow (10) Patent No.: US 8,325,893 B2
(45) Date of Patent: Dec. 4, 2012

(54) CLICK-TO-CALL ATTACK PREVENTION

(75) Inventor: Vlad Vendrow, Redwood Shores, CA (US)

(73) Assignee: RingCentral, Inc., San Mateo, CA (US)

(*) Notice: Subject to any disclaimer, the term of this patent is extended or adjusted under 35 U.S.C. 154(b) by 831 days.

(21) Appl. No.: 12/428,426

(22) Filed: Apr. 22, 2009

(65) Prior Publication Data

US 2010/0128862 A1 May 27, 2010

Related U.S. Application Data (60) Provisional application No. 61/117,534, filed on Nov. 24, 2008.

(51) Int. Cl.
*H04M 3/00* (2006.01)
*H04M 3/42* (2006.01)
*H04M 1/64* (2006.01)

(52) U.S. Cl. ............ 379/189; 379/88.17; 379/198; 379/207.02; 379/210.02

(58) Field of Classification Search .......... 379/201.02, 379/207.02, 210.01, 88.17, 198, 189, 210.02
See application file for complete search history.

(56) References Cited

U.S. PATENT DOCUMENTS

| | | | | |
|---|---|---|---|---|
| 6,038,305 | A * | 3/2000 | McAllister et al. ...... | 379/201.02 |
| 6,775,704 | B1 * | 8/2004 | Watson et al. ........... | 709/229 |
| 7,218,714 | B2 * | 5/2007 | Liu et al. ............... | 379/202.01 |
| 7,526,803 | B2 * | 4/2009 | D'Souza et al. ......... | 726/22 |
| 7,593,343 | B1 * | 9/2009 | Croak et al. ............ | 370/241 |
| 7,701,854 | B2 * | 4/2010 | Acharya et al. ......... | 370/235 |
| 7,933,985 | B2 * | 4/2011 | Kurapati et al. ........ | 709/224 |
| 8,069,471 | B2 * | 11/2011 | Boren .................... | 726/3 |
| 8,176,553 | B1 * | 5/2012 | Magdych et al. ....... | 726/23 |
| 8,180,032 | B2 * | 5/2012 | Yasrebi et al. .......... | 379/189 |
| 2003/0147519 | A1 * | 8/2003 | Jain et al. ............... | 379/211.02 |
| 2003/0171120 | A1 * | 9/2003 | Mustapha ............... | 455/445 |
| 2005/0105464 | A1 * | 5/2005 | Acharya et al. ......... | 370/229 |
| 2005/0108567 | A1 * | 5/2005 | D'Souza et al. ......... | 713/201 |
| 2006/0039540 | A1 * | 2/2006 | Issinski ................... | 379/45 |
| 2007/0171898 | A1 * | 7/2007 | Salva ...................... | 370/356 |
| 2008/0089494 | A1 * | 4/2008 | Kaas et al. .............. | 379/93.02 |
| 2008/0201776 | A1 * | 8/2008 | Rao et al. ................ | 726/22 |
| 2008/0310399 | A1 * | 12/2008 | Narayanan et al. ..... | 370/352 |
| 2009/0003543 | A1 * | 1/2009 | Altberg et al. .......... | 379/88.13 |
| 2009/0010414 | A1 * | 1/2009 | Siegrist .................. | 379/210.02 |
| 2009/0293123 | A1 * | 11/2009 | Jackson et al. .......... | 726/23 |
| 2010/0091764 | A1 * | 4/2010 | Merino Gonzalez et al. | 370/352 |

* cited by examiner

*Primary Examiner* — Lisa Hashem
(74) *Attorney, Agent, or Firm* — Fish & Richardson P.C.

(57) ABSTRACT

System and methods for preventing abusive use of a click-to-call callback function of virtual PBX services are disclosed. In some implementations, a challenge-response procedure can be implemented, and a click-to-call request is allowed when a correct response is timely received. In some implementations, one or more system wide policies can be applied in determining whether a click-to-call request should be allowed or denied. A system policy for blocking and unblocking requests having a particular request parameter (e.g., source IP address) is disclosed. An account specific policy for setting the state of a particular account targeted by a click-to-call request as normal, warning, or blocked, based on the current status of the particular account is also disclosed.

21 Claims, 9 Drawing Sheets

CLICK-TO-CALL ATTACK PREVENTION

CROSS-REFERENCE TO RELATED APPLICATIONS

This application claims the benefit of U.S. Provisional Application Ser. No. 61/117,534, filed on Nov. 24, 2008, the entire content of which is hereby incorporated by reference.

TECHNICAL FIELD

This subject matter relates to abusive use prevention for virtual PBX services.

BACKGROUND

A private branch exchange (PBX) is a telephone network that serves a business or an office. A virtual PBX (vPBX) allows a business or office to be served by a PBX system hosted on remote servers. The service is provided through a combined voice network (e.g. telephone network) and data network (e.g. Internet).

Although online sales transactions have become ubiquitous, complex purchasing decisions for high value items can benefit from the help of a live sales representative. Customers often prefer a live person over the telephone to answer billing, delivery, product support, and general order inquiries than through email or text chat. The click-to-call service (sometimes referred to as "click-to-call callback" service) offered by a virtual PBX service provider gives a service subscriber (e.g., a small business) the ability to place a user interface element (e.g., a "RingMe" button) on its company website or email advertising messages inviting a viewer of the website or email messages (e.g., an existing or potential customer) to send a request for a live callback from the subscriber. The click-to-call callback function allows a customer to immediately speak with a customer service representative. The call can either be made to a software client running on a computer using Voice over Internet Protocol (VoIP) technology or to a telephone number provided by the customer.

SUMMARY

One or more click-to-call attack prevention techniques are disclosed:

In one aspect, a method of preventing a denial of service attack at a virtual PBX service provider is disclosed. The method includes receiving a click-to-call request from a user that targets a subscriber account served by the virtual PBX service provider; identifying a click-to-call request parameter associated with the click-to-call request; detecting a number of previous click-to-call requests associated with the click-to-call request parameter during a first time period, the number exceeding a first predetermined threshold; and denying the click-to-call request from the user and any future click-to-call request associated with the click-to-call parameter for a second predetermined time period.

In some implementations, one or more of the following features can be included in the method of preventing a denial of service attack at a virtual PBX service provider.

In some implementations, the number of previous click-to-call requests associated with the click-to-call request parameter is determined on an account level of the targeted subscriber account, and the first predetermined threshold is specified in an account-specific policy of the targeted subscriber account.

In some implementations, denying the click-to-call request further comprises: determining a current state of the targeted subscriber account at a time of the click-to-call request, the current state being one of a warning state, a blocked state, or a normal state. If the current state is the warning state, the method further includes presenting a challenge to the user; and denying the click-to-call request if the user fails the challenge. If the current state is the blocked state, the method further includes denying the click-to-call request if the second time period has not expired at the time of the click-to-call request. If the current state is the normal state, the method further includes changing the current state to the warning state; presenting a challenge to the user; and denying the click-to-call request if the user fails the challenge.

In some implementations, before denying the click-to-call request due to a number of previous allowed click-to-call requests exceeding a threshold on an account level, the method further includes determining a second number of previous click-to-call requests associated with the click-to-call request parameter on a system level of the virtual PBX service provider during a third predetermined time period and verifying that the second number does not exceed a second predetermined threshold that is specified in a system policy of the virtual PBX service provider.

In some implementations, the click-to-call parameter is a source Internet Protocol (IP) address of the user.

In some implementations, the click-to-call parameter is a callback telephone number of the user.

In some implementations, the number of previous click-to-call requests associated with the click-to-call request parameter is determined on a system-level of the virtual PBX service provider, and the first predetermined threshold is specified in a system policy of the virtual PBX service provider.

In some implementations, an unconditional challenge-response and verification process is conducted before a click-to-call request is allowed. In some implementations, one or more system policies are applied before a click-to-call request is allowed. In some implementations, the one or more system policies check the current system status and one or more parameters of the click-to-call request (e.g., such as the initiating IP address) against a predetermined condition before the click-to-call request is allowed. In some implementations, one or more account specific policies are applied before a click-to-call request is allowed. In some implementations, the one or more account specific policies check the account's current state against one or more conditions before the click-to-call request is allowed.

The details of one or more implementations of the abusive use prevention techniques for click-to-call service are set forth in the accompanying drawings and the description below. Other features, objects, and advantages of the techniques will be apparent from the description and drawings, and from the claims.

DESCRIPTION OF DRAWINGS

Like reference symbols in the various drawings indicate like elements.

DETAILED DESCRIPTION

System Overview

Figure 1:
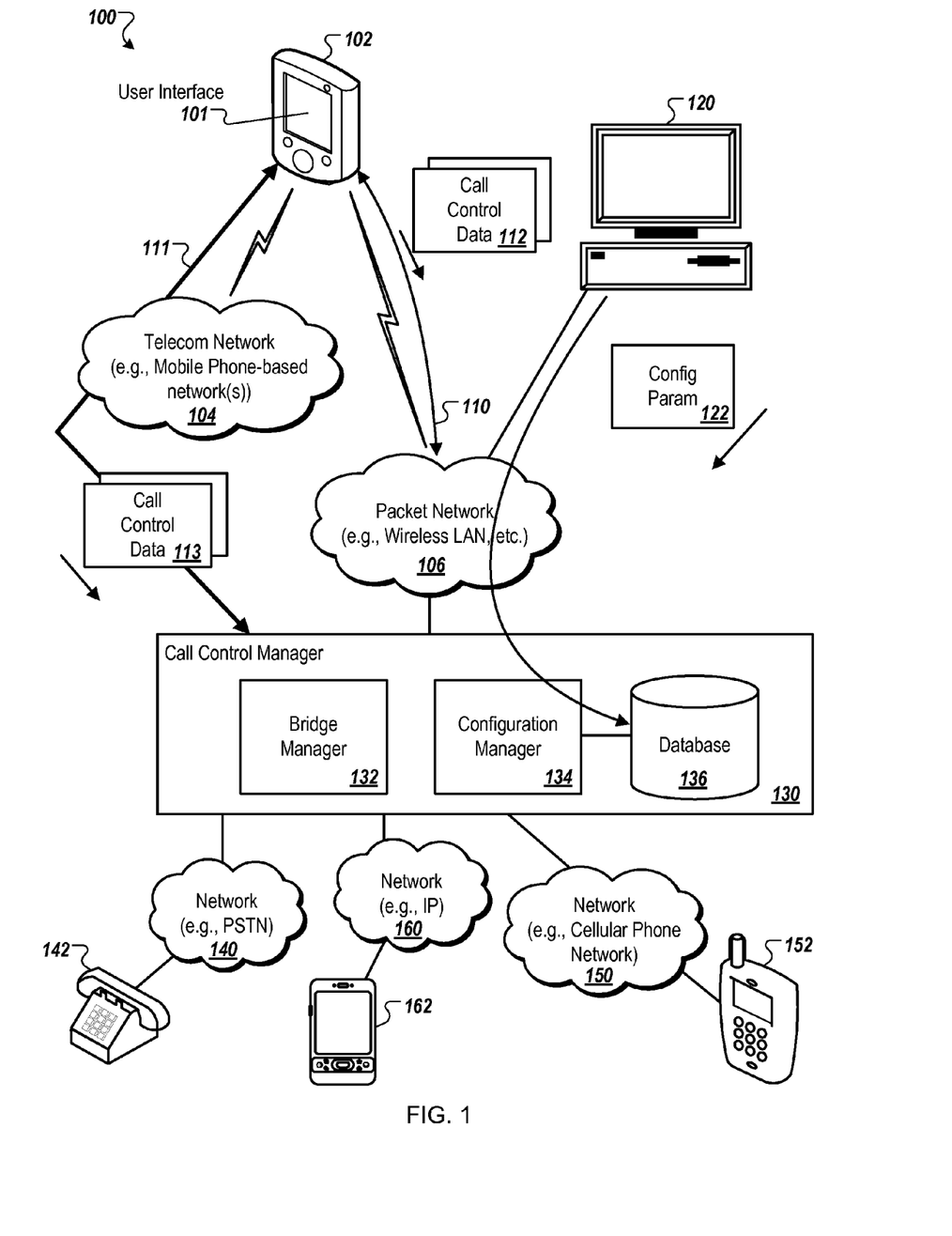
FIG. 1 is a block diagram of an example call management system, including a mobile device configured to interact with a call control manager.

FIG. 1 is a block diagram of a call management system 100, including a mobile device 102 configured to interact with a call control manager 130. The call control manager 130 can run on a server of a virtual PBX service provider and can serve as virtual PBXs (or a component thereof) for the subscribers of the virtual PBX services. In some implementations, the call control manager 130 can provide the click-to-call service to or from the mobile device 102 and/or computing device 120.

In this example, the mobile device 102 can be configured to communicate using multiple modes of communication (i.e., "multi-modal channels of communication"). Network 104 operates in accordance with a first mode of communication. Examples of the first mode of communication include Public Switched Telephone Network ("PSTN") phone technologies, cellular/wireless telephone technologies/standards, such as Global System for Mobile communications ("GSM"), Frequency Division Multiple Access ("FDMA"), Time Division Multiple Access ("TDMA"), Code division multiple access ("CDMA"), and the like. Network 106 operates in accordance with a second mode of communication. Examples of the second mode of communication include VOIP phone technologies, wireless LAN technologies (e.g., telephone technologies/standards, such as WiMAX and any other IEEE 802.xx-based technologies/standards), and the like. Any number of modes is possible.

Further to FIG. 1, mobile device 102 can be configured to interact with a call control manager 130, over a call control communications channel, which in some implementations can be a broadband call control channel 110. In some implementations, broadband call control channel 110 can be established in network 106 (e.g., in the same or separate channel used to convey voice/video data, such as in a Session Initiation Protocol ("SIP") message). Note that in some implementations, another narrowband call control channel 111 can be established in network 104 (e.g., a mobile phone operator can provide in the same or separate channel used to convey voice/video data, such as in a Short Message Service ("SMS") message). Mobile device 102 and/or call control manager 130 can be configured to establish narrowband 111 and/or broadband 110 call control channels so mobile device 102 and/or call control manager 130 can transmit and/or receive call control data 113 (over the narrowband call control channel 111) and/or 112 (over the broadband channel 110). Call control manager 130 can be configured to effect a number of call controlling functions that can be performed remotely from mobile device 102. Thus, call control manager 130 can perform call control operations in association with a first call from a phone 142 via network 140 and/or a second call from a phone 152 via network 150 and/or a second call from a phone 162 via a network 160.

In some implementations, call control manager 130 can be disposed in a central office ("CO"). In some implementations, mobile device 102 includes an interface, such as a user interface 101, for facilitating generation, receipt, processing, and management of call control data 112 and 113 for delivery over narrowband 111 and/or broadband 110 call control channels. Interface 101 can be configured to implement the functionalities described herein, including receiving inbound calls, dialing outbound calls, placing click-to-call requests, and receiving click-to-call callbacks.

In at least some implementations, call control manager 130 includes a bridge manager 132, a configuration manager 134, and a repository ("DB") 136. Bridge manager 132 can be configured to perform inbound call delivery, call routing, call transfer functions, conference call functions, click-to-call functions, and the like, for mobile device 102. Note that call control manager 130 provides for bridging calls generated by disparate telecommunications technologies associated with communications devices 142 and 152 and 162. As an alternative to answering an inbound call on mobile device 102, the call can be recorded (such as voice mail) on mobile device 102 and/or on the call control manager 130 and simultaneously reviewed on mobile device 102 via user interface 101. During call recording, the inbound call can be answered dynamically at mobile device 102 and/or transferred to one or more of communications devices 142, 152, and 162. Completed recordings (e.g., announcements, voice mail, etc.) can be reviewed at mobile device 102 via user interface 101.

Configuration manager 134 can be configured to interact with a remote computing device 120 or with a mobile device 102 to receive configuration parameter data ("conf param") 122. Further, configuration manager 134 can be configured to store configuration parameter data 122, and responsive to such data, call control manager 130 can be implemented by a user to control inbound calls before, during, or after reaching mobile device 102. Further, configuration manager 134 can be configured to store in database 136 audio files recorded via user interface 101 on device 102 and transmitted to call control manager 130 via narrowband 111 and/or broadband 110 call control channels.

In some implementations, a click-to-call request can be generated by a user through a web interface provided by a subscriber of the virtual PBX services. The web interface typically includes a user interface element, such as a "click-to-call" button, by which the click-to-call request can be made. The user interface element is associated with a script provided by the virtual PBX service provider specifically for the subscriber. The script is executed when the user invokes the user interface element, for example, by clicking on it. The script generates and sends the click-to-call request to the virtual PBX service provider (e.g., to the call control manager 130). The click-to-call request identifies the particular subscriber for which the click-to-call request is intended. For example, the click-to-call request can include an assigned identifier for the subscriber or an assigned phone number of the subscriber. The assigned phone number can be a local phone number, a toll-free phone number, or an international phone number, etc. When the user places a click-to-call request, the user typically are required to enter a callback phone number by which the subscriber can reach the user, and that callback phone number is also sent to the call control manager in the click-to-call request. In some implementations, the callback can be made to a web interface that implements VOIP functions. In such implementations, the click-to-call request includes information such as the IP address of the device from which the click-to-call request is sent. The click-to-call request can typically be placed from a mobile device 102, a computing device 120, and/or a smart phone 160.

When the click-to-call request is delivered through one or more available networks to the virtual PBX service provider (e.g., to the call control manager 130), the call control manager 130 places two calls. One of the two calls is made to the callback phone number (or call back IP address) specified in the click-to-call request by the user (i.e., the requester). The other of the two calls is made to a phone number of the subscriber for whom the click-to-call request is intended. Typically, the phone number of the subscriber is a phone number assigned to the subscriber by the virtual PBX service provider. In some implementations, the subscriber can specify which phone number he would like to use to place the click-to-call callback to the user. For example, this information can be provided by the subscriber as part of the configuration parameters and stored in the database 136 of the call control manager 130.

Once the user accepts the first call from the call control manager 130, and the subscriber (or an agent of the subscriber, including a representative on an extension of the subscriber's virtual PBX) accepts the second call from the call control manager 130, the bridge manager 132 of the call control manager 130 connects the two calls to establish a joint call connection between the subscriber (or an agent of the subscriber) and the user. The user can now speak to the subscriber (or the agent of the subscriber) through the joint call connection. The click-to-call function is completed. In some implementations, the call to the subscriber may be transferred to a voice mail box according to the configuration of the subscriber's account. The user can leave a voice mail through the joint call connection.

Example Mobile Device Implementation

Figure 2:
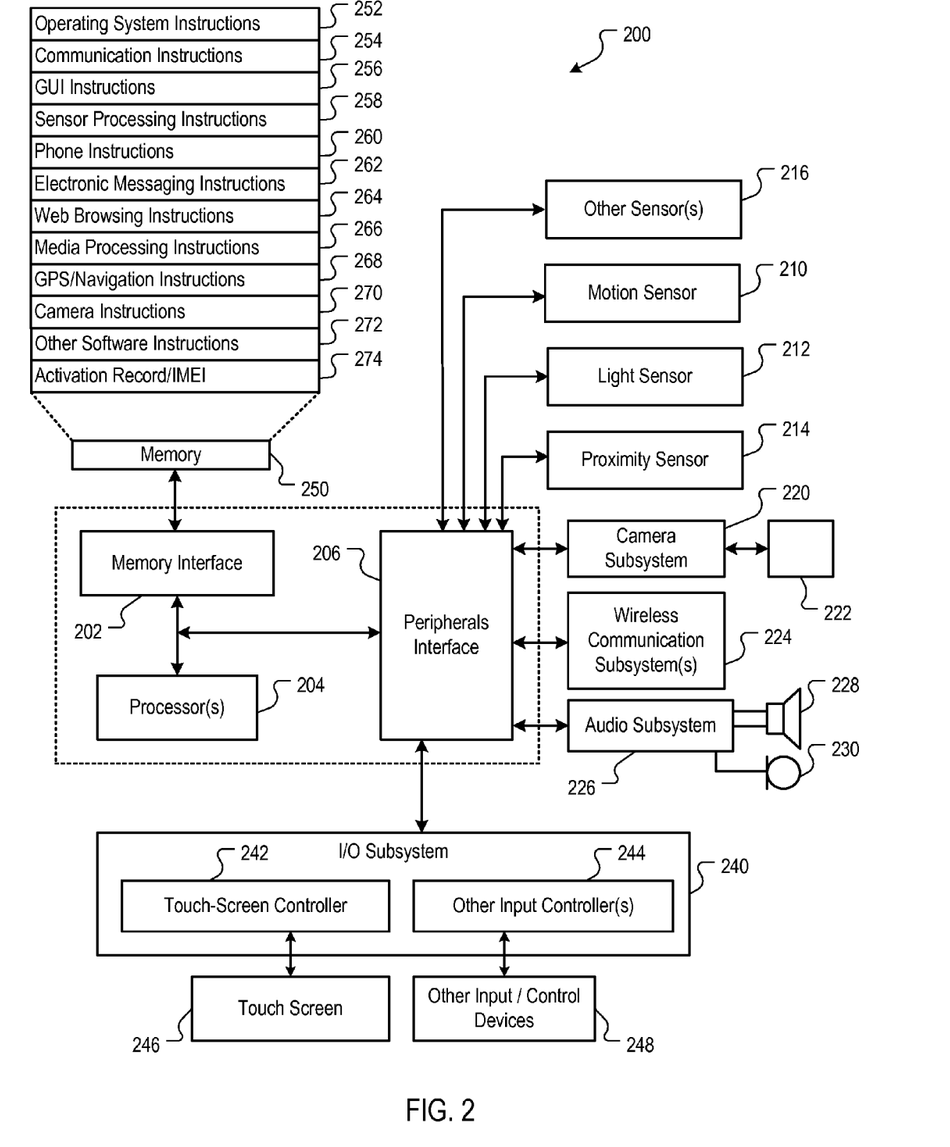
FIG. 2 shows example system architecture of a mobile device.

FIG. 2 is a block diagram of an example implementation 200 of a mobile device (e.g., mobile device 102). The mobile device can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a positioning system (e.g., GPS receiver), a temperature sensor, a biometric sensor, or other sensing device, to facilitate related functionalities.

A camera subsystem 220 and an optical sensor 222, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile device is intended to operate. For example, a mobile device can include communication subsystems 224 designed to operate over a GSM network, a GPRS network, an EDGE network, a Wi-Fi or WiMax network, and a Bluetooth™ network. In particular, the wireless communication subsystems 224 can include hosting protocols such that the mobile device can be configured as a base station for other wireless devices.

An audio subsystem 226 can be coupled to a speaker 228 and a microphone 230 to facilitate voice-enabled functions, such as voice recognition, voice replication, digital recording, and telephony functions.

The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230.

In one implementation, a pressing of the button for a first duration can disengage a lock of the touch screen 246; and a pressing of the button for a second duration that is longer than the first duration can turn power to the mobile device on or off. The user can be able to customize a functionality of one or more of the buttons. The touch screen 246 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player.

The memory interface 202 can be coupled to memory 250. The memory 250 can include high-speed random access memory and/or non-volatile memory, such as one or more magnetic disk storage devices, one or more optical storage devices, and/or flash memory (e.g., NAND, NOR). The memory 250 can store an operating system 252, such as Darwin, RTXC, LINUX, UNIX, OS X, WINDOWS, or an embedded operating system such as VxWorks. The operating system 252 can include instructions for handling basic system services and for performing hardware dependent tasks. In some implementations, the operating system 252 can be a kernel (e.g., UNIX kernel).

The memory 250 can also store communication instructions 254 to facilitate communicating with one or more additional devices, one or more computers and/or one or more servers. The memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes and instructions; camera instructions 270 to facilitate camera-related processes and functions; and/or other software instructions 272 to facilitate other processes and functions. The memory 250 can also store other software instructions (not shown), such as web video instructions to facilitate web video-related processes and functions; and/or web shopping instructions to facilitate web shopping-related processes and functions. In some implementations, the media processing instructions 266 are divided into audio processing instructions and video processing instructions to facilitate audio processing-related processes and functions and video processing-related processes and functions, respectively. An activation record and International Mobile Equipment Identity ("IMEI") 274 or similar hardware identifier can also be stored in memory 250.

Each of the above identified instructions and applications can correspond to a set of instructions for performing one or more functions described above. These instructions need not be implemented as separate software programs, procedures, or modules. The memory 250 can include additional instructions or fewer instructions. Furthermore, various functions of the mobile device can be implemented in hardware and/or in software, including in one or more signal processing and/or application specific integrated circuits.

Example Call Control Manager

Figure 3:
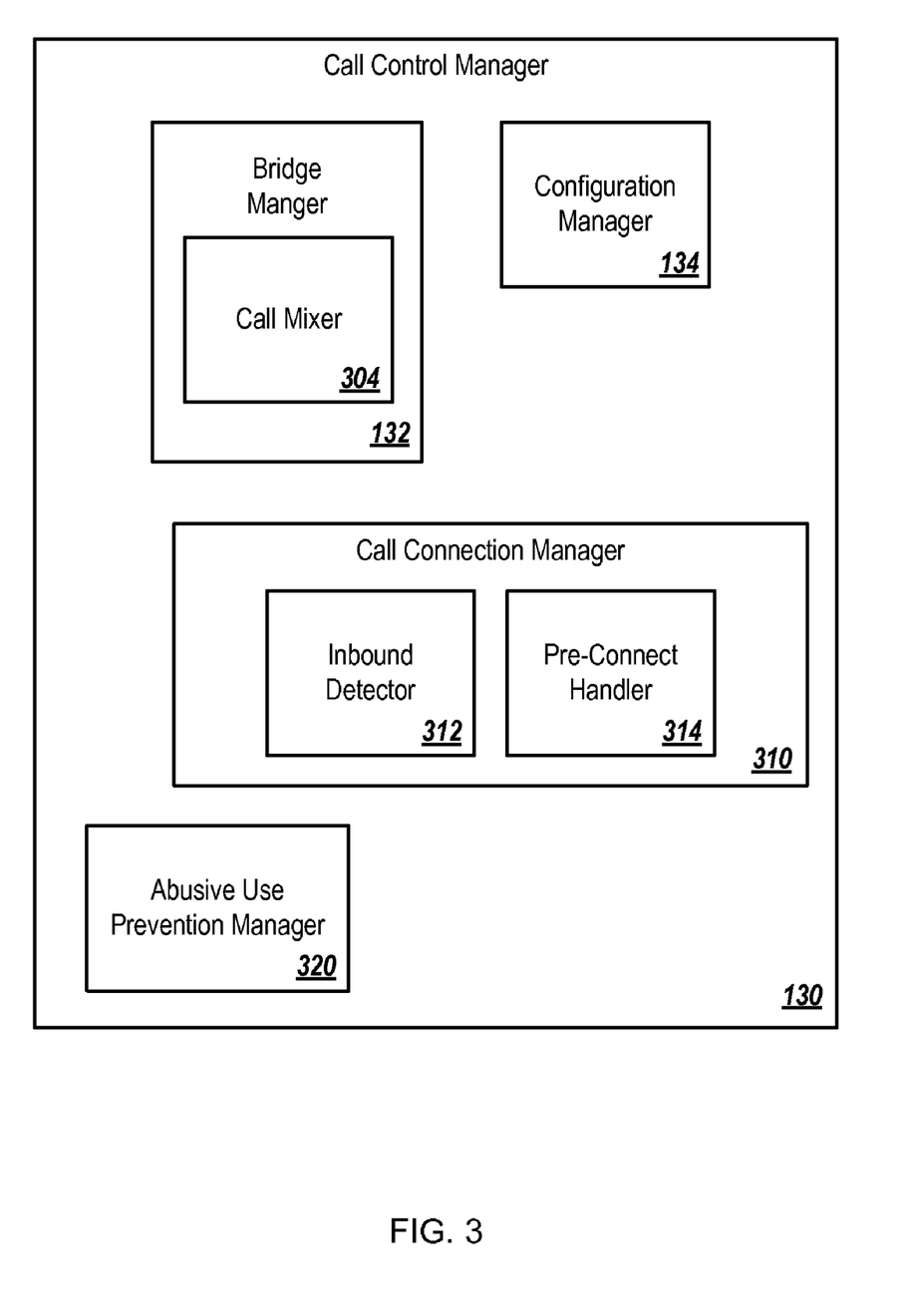
FIG. 3 is a block diagram of an example call control manager including an abusive use prevention manager.

FIG. 3 is a block diagram of an example call control manager 130. Call control manager 130 can include a bridge manager 132, a configuration manager 134 configured to receive configuration parameters and execute call functions in accordance with the configuration parameters, a call connection manager 310, and an abusive use prevention manager 320 configured to implement the abusive use prevention techniques described herein. Bridge manager 132 can include a call mixer 304. In some cases, call mixer 304 can be configured to combine calls using various telecommunication technologies and protocols. Thus, call mixer 304 can use different CODECs to implement the various telecommunication technologies and protocols. In some cases, call mixer 304 can reside in the mobile device, which can be a mobile device 102. In some implementations, the call mixer 304 resides on a virtual PBX server. Call connection manager 310 can include an inbound detector 312 and a pre-connection handler 314. Inbound detector 312 can detect a call (or a request for callback) from any communications device (e.g., communications devices 142 or 152 or 162 of FIG. 1) and can determine whether a communication link via network 106 of FIG. 1 to mobile device 102 can be established. For example, inbound detector 312 can communicate with mobile device 102 to determine whether a data rate of more than, for example, 8 kb/sec is obtainable. If not, inbound detector 312 can provide a course of action (e.g., sending the call to voicemail) until the data rate is above some acceptable threshold. Pre-connect handler 314 can interact with mobile device 102 to receive an instruction in call control data 112 to handle a call from either communications device 142 or 152, or a click-to-call request from communication device 162 of FIG. 1 before a connection is made. Pre-connect handler 314 can also interact with mobile device 102 to receive an instruction from call control data 113 to handle a call (or a request for callback) from a communication device, such as device 162 of FIG. 1. For example, call control data 113 can be incorporated into an SMS message (or any other type of messaging protocol) capable of transport via network 104. Thus, mobile device 102 can generate call control data 113 that includes an instruction that causes call control manager 130 to generate a message to any of communications devices 142, 152, and 162 of FIG. 1. An example of such a message is "I am out of wireless LAN range. I will call you later when I can make a VOIP call." Any of the components of call control manager 130 can be implemented in hardware or software, or a combination thereof. Any of the functions of call control manager 130 can be available to any communications devices 142, 152, and 162 as to the mobile device 102 of FIG. 1.

An Example Abusive Use Prevention Manager

Figure 4:
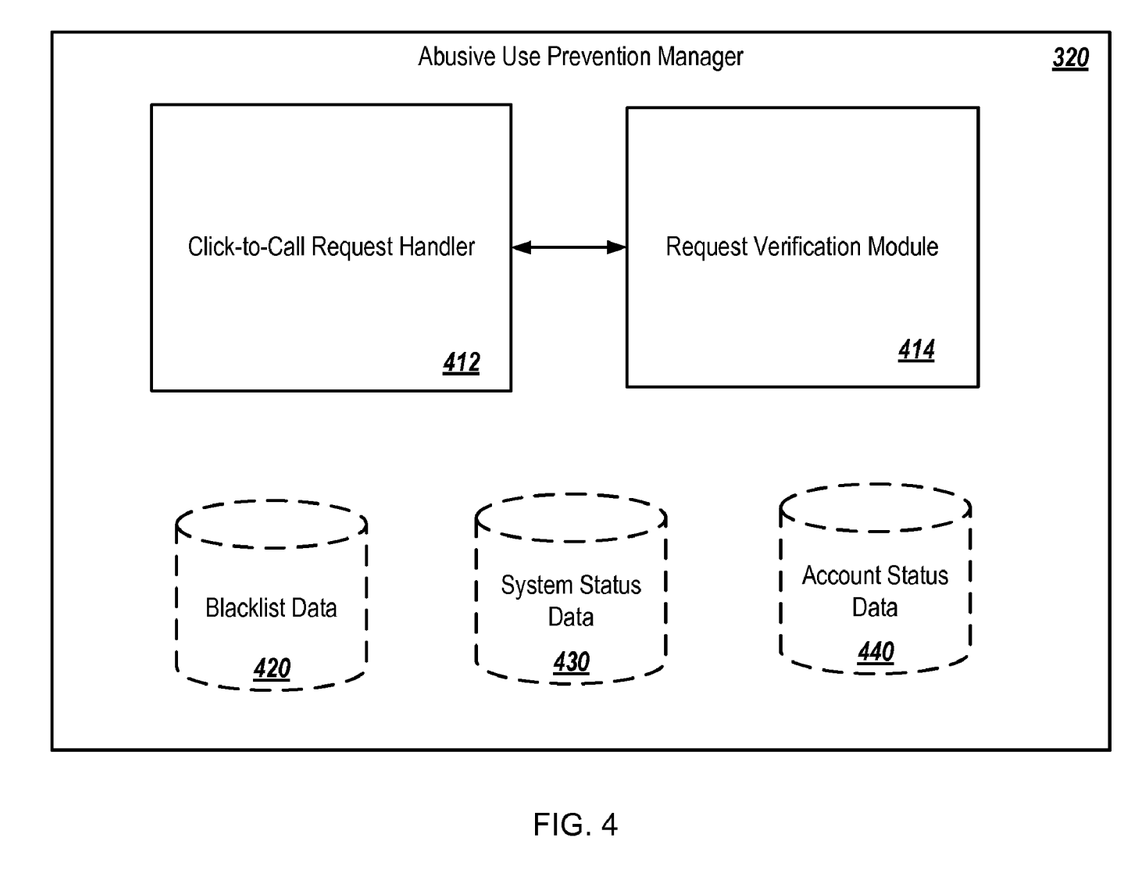
FIG. 4 is a block diagram of an example abusive use prevention manager in a call control manager.

FIG. 4 is a block diagram of an example abusive use prevention manager 320.

Although the click-to-call function is an important marketing and customer support tool for businesses, the open accessibility of the click-to-call function can expose the businesses and the virtual PBX service provider to malicious denial-of-service (DoS) attacks. Computer-generated requests for callbacks can overwhelm or slow down a virtual PBX server system, or side-track a business sales representative or customer support team. Furthermore, some subscriber accounts have auto-purchase option enable to meet increased call service demand, and the subscribers can incur substantial costs to on these unwarranted or fraudulent callbacks. In addition, pranksters can also enter false or computer-generated phone numbers in their click-to-call requests to induce businesses to call back to unsuspecting callees causing annoyance.

In order to provide better service to virtual PBX service subscribers and protect the virtual PBX servers from click-to-call related DoS attacks, click-to-call abuse prevention procedures can be implemented to prevent or reduce the impact of fraudulent click-to-call requests. In some implementations, the click-to-call abuse prevention can be carried out by an abuse prevention manager 320 in the call control manager of the virtual PBX server. In some implementations, the abusive use prevention manager 320 can include a click-to-call request handler 412 and a request verification module 414. The abusive use prevention manager 320 can also include one or more databases 420, 430, and 440 for storing the request parameters of blacklisted click-to-call requests (e.g., blacklist data), the current system status (e.g., system status data), and the current account status of subscriber accounts (e.g., account status data). Optionally, the one or more databases can also include historic data in each of the above categories, e.g., system usage history, repeated offenders on the blacklists, and account history for click-to-call service usage, etc.

In some implementations, the click-to-call request handler 412 receives click-to-call requests over one or more communication networks, such as a packet network (e.g., a wireless LAN, etc.). When a viewer of a website or email message containing a click-to-call button invokes the click-to-call function, a user interface can be presented for the user to enter a callback telephone number. The callback number and the click-to-call request can then be sent to the click-to-call request handler 412 through one or more communication networks. In some implementations, the click-to-call request can include information such as the IP address from which the request is initiated (i.e., the source IP address), the time of the request, the subscriber account to which the request is directed, a desired callback time, and so on. In some implementations, the click-to-call request can also include information for the type of device or software application from which the click-to-call request is initiated and/or to which the callback is to be directed. The type of device or software application can include a computer, a mobile device, a cellular phone, a land phone, a telephony software application, a VoIP application, and so on.

When a click-to-call request is received by the click-to-call handler 412, the request can be forwarded to the request verification module 414. The request verification module 414 can perform one or more tests to verify whether the request is a legitimate one.

If the request meets all the tests, the request verification module 414 can forward the click-to call request to the bridge manager 132 and the call connection manager 310 in the call control manager 130 of FIG. 3. In some implementations, the bridge manager 132 places a call to the callback number specified in the click-to-call request, and a call to the subscriber account specified in the click-to-call request. In some implementations, the two calls are joined by the call mixer 304 in the bridge manager 132, giving the appearance that a single call connection has been established between the click-to-call requester and the subscriber specified in the request. In some implementations, the call control manager 130 will deliver the call according to the configuration data specified by the configuration manager 134, such as the standard greetings, forwarding rules, voicemail rules, and so on.

If the request fails to meet one or more tests, the request verification module 414 can reject the click-to-call request and optionally send back a warning message alerting the requester of the failure. In some implementations, the one or more databases are updated to record data regarding the failed click-to-call request. The data regarding the failed click-to-call request can include the source IP address of the click-to-call request, the time of the request, the callback telephone number, the subscriber's account ID, and so on. In some implementations, the data recorded is used for analysis and for determining actions with respect to subsequent click-to-call requests received by the click-to-call request handler 412.

In some implementations, the request verification module 414 can generate a challenge-response test to send back to the user initiating the click-to-call request. In some implementations, the challenge-response test can be a captcha, e.g., a distorted word or image that is easily recognizable by a human user but is difficult to decipher by a machine (e.g., a computer). In some implementations, the challenge response test can utilize one or more random instructions that are easily followed by a person, but not by a program on a machine. For example, the challenge can be to "identify an action out of the following: red, read, rod, rug," or to "press the "r" key when you see the logo changes to a red color," and so on. Once the user submits a response, the request verification module 414 can check the response against a correct response paired with the challenge. In some implementations, if the challenge response test is not passed, e.g., no response is received from the click-to-call requester, or if the response is incorrect, the request verification module 414 determines that the callback requested will not be performed. Optionally, the request verification module 414 can send a warning message to the click-to-call requester, alerting that no callback will be performed.

In some implementations, the request verification module 414 can implement one or more click-to-call policies. A click-to-call policy can be a system-wide policy or an account specific policy. Each click-to-call policy can include one or more rules. Each rule can include a condition and an action. When a new click-to-call request is received, request verification module 414 applies the click-to-call policies to the new click-to-call request. Request parameters are tested against the conditions in the rules of the policies, and appropriate actions specified by the rules are carried out if the conditions are satisfied.

In some implementations, the system policies are applied before the account specific policies. For example, if a click-to-call request is blocked at the system policy level, no other account specific policies need to be executed, and the click-to-call request is rejected. In some implementations, account level policies can also be executed concurrently with the system level policies.

In some implementations, system-wide policies consider the click-to-call request parameters (e.g., source IP address) and the system's current status (e.g., current load, number of click-to-call requests processed from a particular source IP address, or time of blocking for a particular source IP address, and so on) to determine whether to allow a click-to-call request or deny it. In some implementations, the request verification module 414 further determines whether to block all click-to-call requests from a particular source IP (e.g., blacklist a source IP address) based on the current system status.

In some implementations, account specific policies consider the click-to-call parameters (e.g., source IP address, callback number, etc.), and the current status of the targeted subscriber account (e.g., the number of click-to-call request allowed during a predetermine time period, or the duration that the account has been in a warning or blocked state) to determine whether to allow a click-to-call request or deny it. In some implementations, the request verification module 414 further determines whether to change the state of a particular account into a normal state, a warning state, or a blocked state, depending on the current account status.

In some implementations, the data regarding the system's current state, the account's current state, the request parameters of the click-to-call requests, and the actions taken by the request verification module 414 are recorded and stored in one or more databases, such as databases 420, 430, or 440, that are either part of the abusive use prevention manager 320 or standalone databases.

Figure 5:
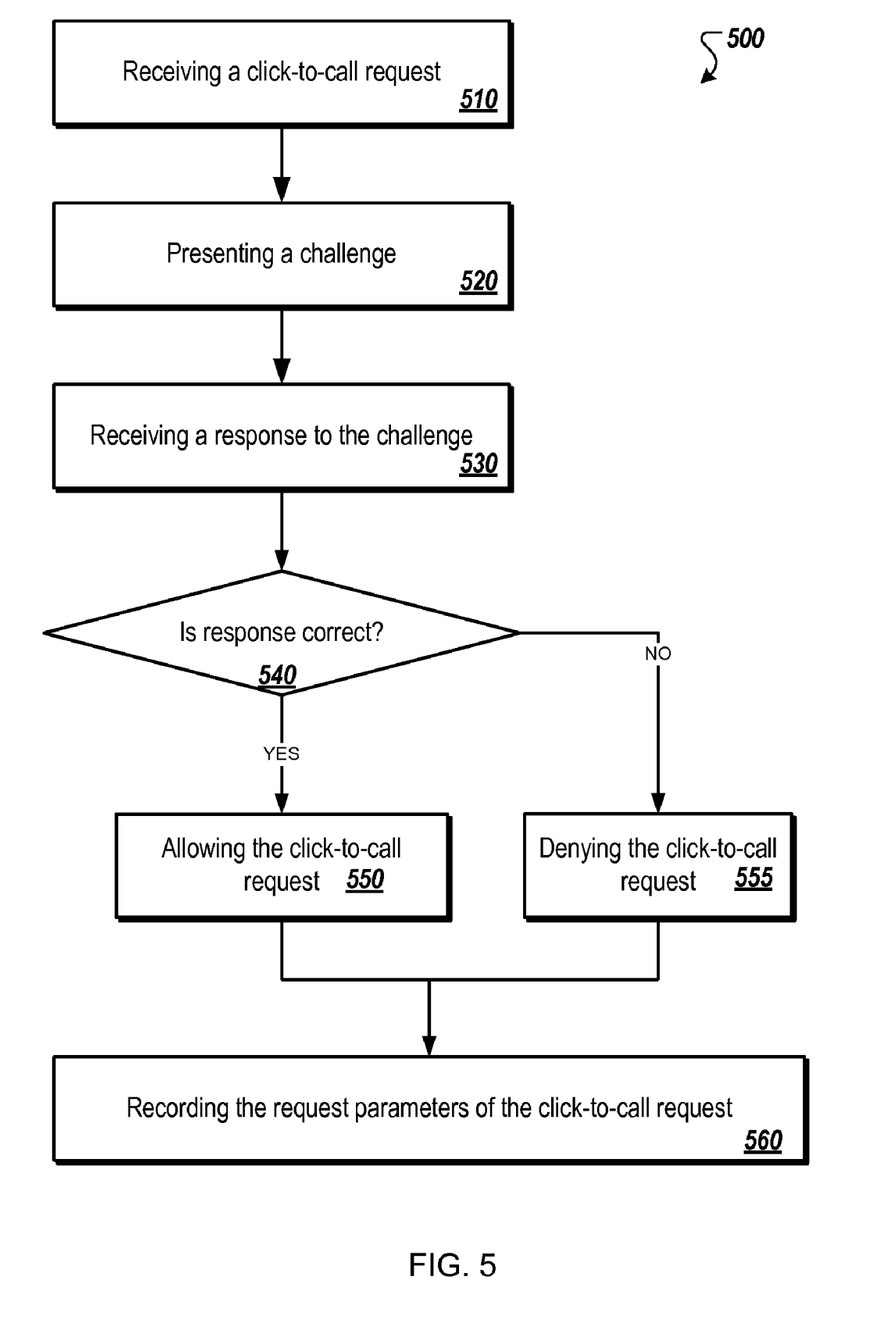
FIG. 5 is a flowchart illustrating an example process of applying challenge-response verification before a click-to-call request is allowed.

FIG. 5 is a flowchart illustrating an example process 500 for applying a challenge-response test before a click-to-call service is initiated.

The example process 500 can include a step 510 for receiving a click-to-call request, a step 520 for presenting a challenge, a step 530 for receiving a response to the challenge, a step 540 for verifying the response, a step 550 for allowing the click-to-call request if the response is correct, and a step 555 for denying the click-to-call request if the response is incorrect. In some implementations, the process can further include a step 560 for recording the request parameters of the failed request and/or the allowed request.

In some implementations, the step 510 for receiving a click-to-call request can be performed by the click-to-call request handler 412 in FIG. 4. In some implementations, the click-to-call request includes information such as a source IP address. The source IP address is an IP address from which the click-to-call request is originated. In some implementations, the source IP address can be used as an identifier for the user sending the click-to-call request.

In some implementations, the challenge sent in step 520 is a captcha challenge. In some implementations, other types of challenges can be used, for example, a random instruction can be selected from a large pool of instructions for the user to carry out and provide an appropriate response. One such instruction can be to "type the third letter of the name of the city in which you are currently located." In some implementations, the response is obtained and verified (540). In some implementations, a predetermined time period is set, and if no response is received before the expiration of the predetermine time period, then the requester is considered to have failed the challenge, and the step 555 for denying the click-to-call request is performed.

In some implementations, the steps for presenting a challenge, receiving a response to the challenge, verifying the response, and allowing or denying the click-to-call request are performed by the request verification module 414 in FIG. 4. In some implementations, the process 500 can be carried out for all click-to-call requests received by the call control manager. In some implementations, a virtual PBX account subscriber can specify whether to institute a challenge-response test for all click-to-call requests directed toward the subscriber's account. In some implementations, such specification is received from a mobile device, such as a mobile telephone, associated with the virtual PBX subscriber account. In some implementations, the click-to-call service provider can institute a challenge-response test for all click-to-call requests originated from a particular source IP address if too many click-to-call requests are being generated from that source IP address during a short period of time. In some implementations, the challenge response test is generated if the request is sent from one of a set of IP addresses in a subnet or a network that has been blacklisted. In some implementations, the blacklisted IP addresses are reinstated after a predetermined time period.

Figure 6:
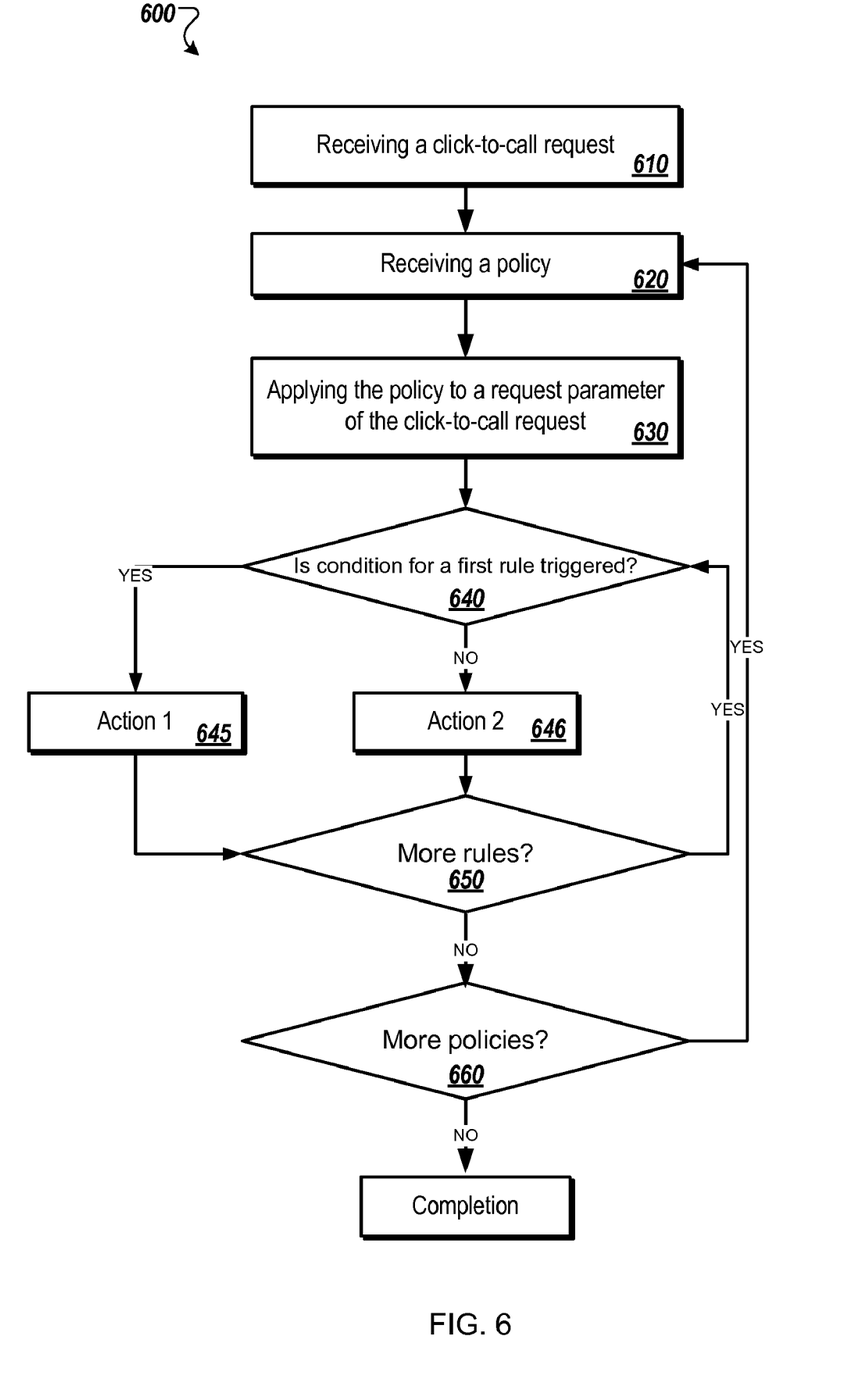
FIG. 6 is a flowchart illustrating an example process for applying one or more policies before a click-to-call request is allowed.

FIG. 6 is a flowchart illustrating an example process 600 for applying one or more policies before a click-to-call service is allowed.

In some implementations, the example process 600 includes: a step 610 for receiving a click-to-call request, a step 620 for identifying a policy associated with handling click-to-call requests, a step 630 for applying the identified policy to a request parameter of the click-to-call request, a step 640 for determining whether a condition for an action in a first rule of the identified policy is triggered, a step 645 for performing one action if the condition is triggered, and a step 646 for performing another action if the condition is not triggered, a step 650 for determining if there are additional rules in the identified policy, and repeating the steps 640, 645, and 646 for the next rule until all rules in the identified policy is applied. Once all the rules in the identified policy have been applied, the process 600 can further include a step 660 for determining whether there are additional policies to be applied, and continue the above steps 620-660 for each of the additional policies until all applicable policies have been applied.

The policies applied in the process 600 can be system wide policies and/or account specific policies. In some implementations, if a condition for denying a click-to-call request is triggered during the application of one policy, the click-to-call request is denied and subsequent policies no longer need to be applied. In some implementations, if a condition for denying a click-to-call request is triggered during the application of a system wide policy and the click-to-call request is denied, then subsequent account specific policies no longer need to be applied.

In some implementations, system-wide policies consider the click-to-call request parameters (e.g., source IP address, callback number, etc.), and the system's current status (e.g., current load, number of click-to-call request processed from a particular source IP address, or time of blocking for a particular source IP address, and so on) to determine whether to allow or deny a click-to-call request. In some implementations, the system policy determines whether to block all click-to-call requests from a particular source IP (e.g., blacklist a source IP address) based on the current system status. In some implementations, the system policy can be used to determine whether to block a request with particular callback numbers. The system policy can check whether a callback number provided in the request is a legitimate phone number. In some implementations, a callback number can be blacklisted.

In some implementations, account specific policies consider the click-to-call parameters (e.g., source IP address, or callback number), and the current status of the targeted subscriber's account (e.g., the number of click-to-call request allowed during a predetermine time period, or the duration that the account has been in a warning or blocked state) to determine whether to allow or deny a click-to-call request. In some implementations, the request verification module 414 further determines whether to change the state of a particular account into a normal state, a warning state, or a blocked state, depending on the current state of the account.

In some implementations, the process 600 can further include steps to store data regarding the system's current state, the account's current state, the request parameters of the click-to-call requests, and the actions taken by the request verification module 414. In some implementations, the data is recorded and stored in one or more databases, such as databases 420, 430, or 440, that are either part of the abusive use prevention manager 320 or standalone databases.

Figure 7:
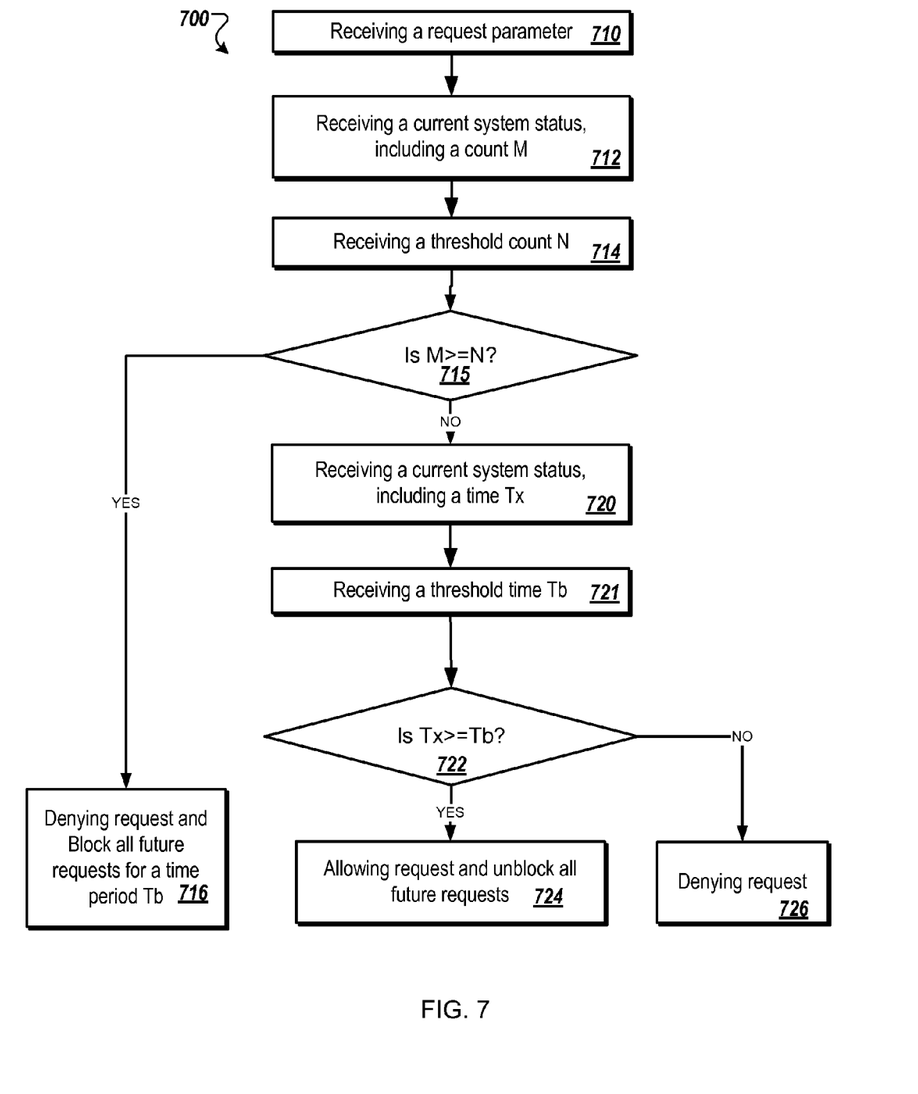
FIG. 7 is a flowchart illustrating a process for applying an example system policy before a click-to-call service is allowed.

FIG. 7 is a flowchart illustrating a process 700 for applying an example system policy before a click-to-call service is allowed.

In some implementations, a system wide policy can include two rules: a blocking rule and an unblocking rule. In some implementations, the blocking rule is executed first. If the blocking rule condition is not met, then the unblocking rule can be executed.

In some implementations, the blocking rule includes: a step 710 for receiving a request parameter (e.g., source IP address) associated with a click-to call request, determining if the request parameter is also associated with other click-to-call requests that have been previously allowed, and if the request parameter is associated with previously allowed click-to-call request, then executing the blocking rule as follows: a step 712 for receiving a current system status including the total number (M) of allowed click-to-call request having the request parameter (e.g., source IP address) during a predetermined time period (T) up to the present time; a step 714 for receiving a first condition specifying a threshold number (N) of click-to-call request having the same request parameter (e.g., source IP address) that can be allowed within the predetermined time period (T); a step 715 for verifying whether a condition is met, the condition being (M>=N); a step 716 for denying the click-to-call request and blocking this and all future click-to-call requests having the same request parameter (e.g., source IP address) for a predetermined time (Tb) if (M>=N); and a step for going to the next step for the unblocking rule if (M<N).

In some implementations, the unblocking rule includes: a step 720 for receiving a current system status including the amount of time (Tx) that the click-to-call requests having the request parameter (e.g., source IP address) have been blocked up to the present time; a step 721 for receiving a predetermined threshold time period (Tb) for blocking requests having the request parameter (e.g., source IP address); a step 722 for verifying whether a condition is met, the condition being (Tx>=Tb); a step 724 for allowing the click-to-call request and unblocking all future click-to-call requests having the same request parameter (e.g., source IP address) if (Tx>=Tb); and a step 726 for denying the click-to-call request if (Tx<Tb).

In some implementations, the blocking rule takes one or more click-to-call parameters as input, such as the source IP address from which the request is initiated. The condition can be a threshold number of click-to-call requests from the same source IP address that have been allowed within a given time period up to the present time. If a request sent from a particular source IP address appears to be machine generated, for example, too many requests are being generated from the same source IP during a short period of time, then the source IP can be used as a signature for an abusive use, and all click-to-call requests from that source IP can be presumed to be bad and can be denied. In some implementations, the threshold number (N) of click-to-call request from the same source IP address can be set to 20, the predetermined time period (T) up to the present time can be set to 10 minutes, and the time period (Tb) to block click-to-call requests from a particular source IP address can be set to 24 hours.

In some implementations, if click-to-call request from a source IP is blocked, the source IP is entered into a blacklist, with a timestamp for the blocking. The information can be stored in a database 420 in FIG. 4. In some implementations, the request verification module 414 records the request parameters of the failed request in a failed request log for future analysis. In some implementations, the request parameters recorded includes the IP address from which the click-to-call request is initiated, the time of the request, the subscriber the request is directed to, a desired callback time, and so on. In some implementations, a blacklisted source IP address can be removed from the blacklist after a substantial amount of time has elapsed. For example, after a substantial amount of time has elapsed, a dynamically assigned IP address may have been reassigned to a different machine or user, and should no longer be blacklisted.

In some implementations, the unblocking rule can be executed first, and then the blocking rule can be executed. For example, when a click-to-call request is received, the source IP address of the click-to-call request is checked against IP addresses on an IP blacklist to see if the source IP address is already blocked. If the source IP is on the blacklist, then it can be checked to see how long it has been blocked. If it has been blocked for longer than the predetermined time period (Tb), then the source IP can be taken off the blacklist and the click-to-call request can be allowed. If the source IP is on the blacklist, but it has not been blocked longer than the predetermined time period (Tb), then the click-to-call request can be denied and the source IP can remain on the blacklist. If the source IP is not on the blacklist, then it is checked to see how many click-to-call requests have been allowed for the predetermined time period (T) up to the present time, and if the number (M) exceeds a predetermined threshold (N), then the source IP is blacklisted, and the click-to-call request is denied. In some implementation, the blacklist includes individual IP addresses, subnets, or LANs.

In some implementations, a policy considers a system status, such as load information of the system, to determine whether to allow or deny a click-to-call request. For example, if the current system status received includes system load information, and if the current load exceeds a predetermined threshold value, the system can deny a click-to-call request. In some implementations, the threshold number of click-to-call requests allowed during a pre-determined time can vary depending on the average load on the server. In some implementations, the time period for blocking can also vary depending on the average load on the server.

Figure 8:
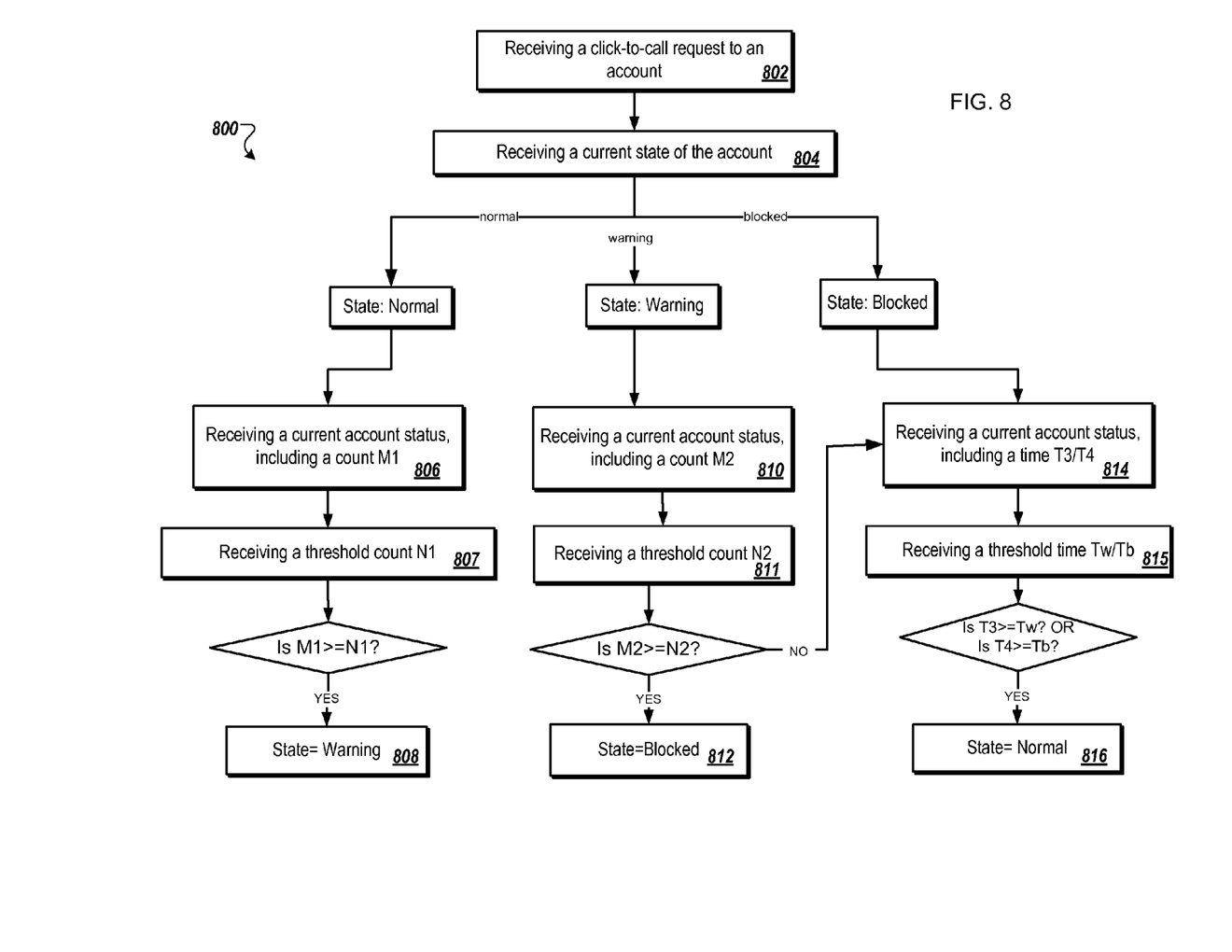
FIG. 8 is a flowchart illustrating a process for applying an example account specific policy before a click-to-call service is allowed.

FIG. 8 is a flowchart illustrating an example process 800 for applying an example account specific policy before a click-to-call request is allowed.

In some implementations, an account specific policy is created by the system for each account, and the conditions in the policy are based on the current status of each account. In some implementations, the account specific policies can be set up or modified by a subscriber of the click-to-call service. In some implementations, a subscriber can set up an account specific policy over an online account management interface, or over the telephone, or over an interface on a mobile device, etc.

In some implementations, each account can be in one of three states: a normal state, a warning state, and a blocked state. In some implementations, the warning state is a state where a challenge-response check is activated. In the warning state, the click-to-call requests are still allowed when the challenge-response check is successfully passed. In some implementations, the blocked state is a state where the click-to-call requests to the account are rejected and the requester sees a message asking the requester to call the account's telephone number directly rather than to enter the requester's own telephone number and wait for a callback. In some implementations, the normal state is a state where click-to-call requests are allowed.

In some implementations, each account specific policy includes three rules: a warning rule, a blocking rule, and an unblocking rule. In some implementations, the warning rule sets the conditions under which the account is transferred from the normal state to the warning state. In some implementations, the blocking rule sets the condition to transfer from the warning state to the blocked state. In some implementations, the unblocking rule sets the condition to transfer from the blocked state (or a warning state) to the normal state. The rules can be executed in the following order: the warning rule, the blocking rule, and then if neither rule is triggered, then the unblocking rule. However, a different order can be implemented as well.

In some implementations, the process 800 for applying an account specific rule includes: a step 802 for receiving a click-to-call request to an account, a step 804 for receiving a current state of the account, and a number of steps for each of the three states: normal, warning, or blocked.

If the current state of the account is the normal state, the warning rule can be applied, including: a step 806 for receiving a count (M1) for the total number of click-to-call requests to the account that have been allowed during a pre-determined time period (T1) up to the present time (e.g., this count can be specified in an account status of the subscriber account), a step 807 for receiving a threshold hold count (N1), (N1) being a predetermined threshold number of click-to-call requests to a particular account that can be allowed during a predetermined time period (T1) up to the present time. If the count (M1) exceeds a predetermined value (N1), then a step 808 for setting the account state to the warning state is performed, and a challenge-response test is applied. If the user fails the challenge-response test, then the click-to-call request is denied. If M1<N1, the click-to-call request is allowed.

In some implementations, if an account is in the warning state, both the blocking rule and the unblocking rule are applied. With respect to the warning state, the unblocking rule is in fact an "un-warning" rule. If the conditions set in the unblocking rule are satisfied, the account is transferred from the warning state to the normal state. With respect to the warning state, if the conditions set in the blocking rule are satisfied, the account is transferred from the warning state to the blocked state. In some implementations, the blocking rule can be applied first, and if the blocking conditions are not triggered, the unblocking rule can be applied. In some implementations, the unblocking ("un-warning") rule can be applied first, and if the unblocking ("un-warning") conditions are not triggered, then the blocking rule is applied.

In FIG. 8, for example, the blocking rule is applied first, including: a step 810 for receiving a count (M2) for the number of click-to-call requests to the account that have been allowed during a predetermined time period (T2) after the account entered into the warning state (e.g., this count can be specified in an account status of the subscriber account), a step 811 for receiving a threshold count (N2), and if that number (M2) exceeds a predetermined value (N2), then a step 812 for setting the account from the warning state into a blocked state and denying the click-to-call request. If M2<N2, the account can remain in the warning state.

After the blocking rule is applied, and if the blocking conditions are not satisfied, i.e., the account remains in the warning state after the blocking rule is applied, the unblocking rule is applied. In some implementations, a step 814 for receiving the time period T3 that the account has been in a warning state, a step 815 for receiving a threshold time period (Tw) (e.g., this time period can be specified in an account status of the subscriber account), and if the time (T3) exceeds a predetermined time period (Tw), and then a step 816 for setting the account from the warning state to a normal state can be performed. After setting the account from the warning state to a normal state, the click-to-call request is allowed. If T3<Tw, the account can remain in the warning state and a challenge-response test can be applied. If the challenge response test is not successfully passed, the click-to-call request is denied.

In some implementations, if an account is in a blocked state, the unblocking rule is applied, including: a step 814 for receiving a time period (T4) that the account has been in the blocked state (e.g., this time period can be specified in an account status of the subscriber account), a step 815 for receiving a threshold time period (Tb), and if the time (T4) exceeds a predetermined time period (Tb), then a step 816 for setting the account from the blocked state to a normal state. After the account is set from the blocked state to a normal state, the click-to-call request is allowed. If T4<Tb, the account remains in the blocked state and the click-to-call request is denied.

An Example Computer System

Figure 9:
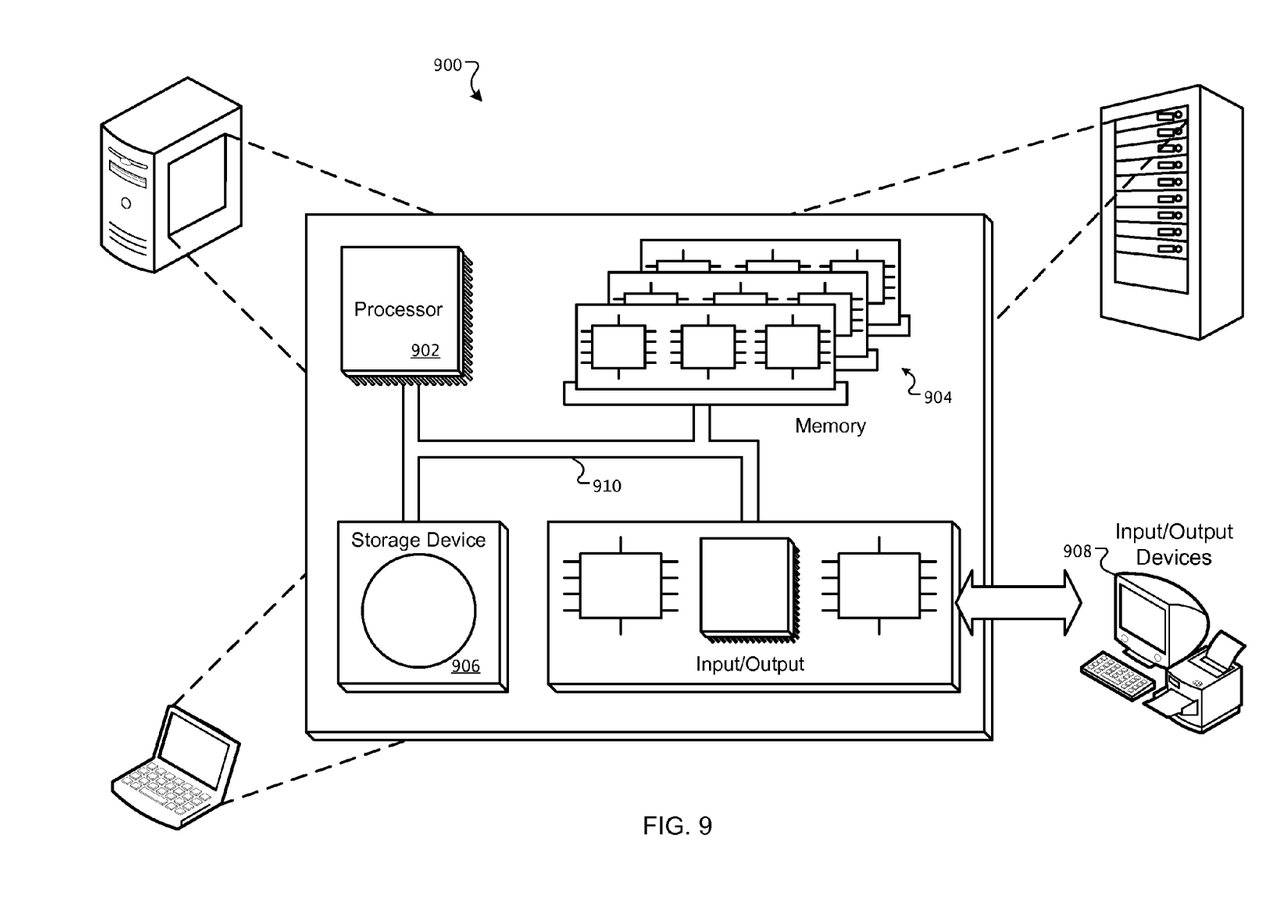
FIG. 9 is a schematic diagram of a generic computer system.

FIG. 9 is a schematic diagram of a generic computer system 900. The system 900 can be used for practicing operations described in association with the techniques described in the disclosure. The system 900 can include a processor 902, a memory 904, a storage device 906, and input/output devices 908. Each of the components 902, 904, 906, and 908 are interconnected using a system bus 910. The processor 902 is capable of processing instructions for execution within the system 900. Such executed instructions can implement one or more components of call manager 130, for example. In one implementation, the processor 902 is a single-threaded processor. In another implementation, the processor 902 is a multi-threaded processor. The processor 902 is capable of processing instructions stored in the memory 904 or on the storage device 906 to display information for a user interface on the input/output device 908.

The memory 904 is a computer readable medium such as volatile or non-volatile memory that stores information within the system 900. The memory 904 could store data structures representing click-to-call request parameters, account configurations, system or account status, and so on, for example. The storage device 906 is capable of providing persistent storage for the system 900. The storage device 906 may be a floppy disk device, a hard disk device, an optical disk device, or a tape device, or other suitable persistent storage means. The input/output device 908 provides input/output operations for the system 900. In one implementation, the input/output device 908 includes a keyboard and/or pointing device. In another implementation, the input/output device 908 includes a display unit for displaying graphical user interfaces.

The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications can be made without departing from the spirit and scope of the invention. For example, the examples were given in C programming language. However, the programmable compiler can be implemented for any imperative computer programming language. Also, the function exp was given to illustrate the efficiency of a reduced accuracy routine. Other mathematical functions can be written to increase efficiency from the standard functions. Accordingly, other implementations are within the scope of the following claims.

A number of implementations of the invention have been described. Nevertheless, it will be understood that various modifications can be made without departing from the spirit and scope of the invention. Accordingly, other implementations are within the scope of the following claims.

What is claimed is:

1. A method of preventing a denial of service attack at a virtual private branch exchange (PBX) service provider, the method comprising:
   receiving a click-to-call request from a user, the click-to-call request targeting a subscriber account served by the virtual PBX service provider;
   identifying a click-to-call request parameter associated with the click-to-call request;
   detecting a number of previous click-to-call requests associated with the click-to-call request parameter during a first time period, the number exceeding a first predetermined threshold; and
   denying the click-to-call request from the user and any future click-to-call request associated with the click-to-call parameter for a second predetermined time period.

2. The method of claim 1, wherein the number of previous click-to-call requests associated with the click-to-call request parameter is determined on an account level of the targeted subscriber account, and the first predetermined threshold is specified in an account-specific policy of the targeted subscriber account.

3. The method of claim 2, wherein denying the click-to-call request further comprises:
   determining a current state of the targeted subscriber account at a time of the click-to-call request, the current state being one of a warning state, a blocked state, or a normal state; and
   if the current state is the warning state,
       presenting a challenge to the user; and
       denying the click-to-call request if the user fails the challenge;
   if the current state is the blocked state,
       denying the click-to-call request if the second time period has not expired at the time of the click-to-call request;
   if the current state is the normal state,
       changing the current state to the warning state;
       presenting a challenge to the user; and
       denying the click-to-call request if the user fails the challenge.

4. The method of claim 2, wherein before the detecting and the denying, the method further comprises determining a second number of previous click-to-call requests associated with the click-to-call request parameter on a system level of the virtual PBX service provider during a third predetermined time period and verifying that the second number does not exceed a second predetermined threshold that is specified in a system policy of the virtual PBX service provider.

5. The method of claim 1, wherein the click-to-call parameter is a source Internet Protocol (IP) address of the user.

6. The method of claim 1, wherein the click-to-call parameter is a callback telephone number of the user.

7. The method of claim 1, wherein the number of previous click-to-call request associated with the click-to-call request parameter is determined on a system-level of the virtual PBX service provider, and the first predetermined threshold is specified in a system policy of the virtual PBX service provider.

8. A non-transitory computer-readable medium having instructions stored thereon, which, when executed by at least one processor, causes the processor to perform operations comprising:
   receiving a click-to-call request from a user, the click-to-call request targeting a subscriber account served by a virtual private branch exchange (PBX) service provider;
   identifying a click-to-call request parameter associated with the click-to-call request;
   detecting a number of previous click-to-call requests associated with the click-to-call request parameter during a first time period, the number exceeding a first predetermined threshold; and
   denying the click-to-call request from the user and any future click-to-call request associated with the click-to-call parameter for a second predetermined time period.

9. The computer-readable medium of claim 8, wherein the number of previous click-to-call requests associated with the click-to-call request parameter is determined on an account level of the targeted subscriber account, and the first predetermined threshold is specified in an account-specific policy of the targeted subscriber account.

10. The computer-readable medium of claim 9, wherein denying the click-to-call request further comprises:
    determining a current state of the targeted subscriber account at a time of the click-to-call request, the current state being one of a warning state, a blocked state, or a normal state; and
    if the current state is the warning state,
        presenting a challenge to the user; and
        denying the click-to-call request if the user fails the challenge;
    if the current state is the blocked state,
        denying the click-to-call request if the second time period has not expired at the time of the click-to-call request;
    if the current state is the normal state,
        changing the current state to the warning state;
        presenting a challenge to the user; and
        denying the click-to-call request if the user fails the challenge.

11. The computer-readable medium of claim 9, wherein before the detecting and the denying, the operations further comprise: determining a second number of previous click-to-call requests associated with the click-to-call request parameter on a system level of the virtual PBX service provider during a third predetermined time period, and verifying that the second number does not exceed a second predetermined threshold that is specified in a system policy of the virtual PBX service provider.

12. The computer-readable medium of claim 8, wherein the click-to-call parameter is an Internet Protocol (IP) address of the user.

13. The computer-readable medium of claim 8, wherein the click-to-call parameter is a callback telephone number of the user.

14. The computer-readable medium of claim 8, wherein the number of previous click-to-call requests associated with the click-to-call request parameter is determined on a system-level of the virtual PBX service provider, and the first predetermined threshold is specified in a system policy of the virtual PBX service provider.

15. A system comprising:
one or more processors;
memory coupled to the one or more processors and operable for storing instructions, which, when executed by the one or more processors, causes the one or more processors to perform operations, comprising:
receiving a click-to-call request from a user, the click-to-call request targeting a subscriber account served by the virtual private branch exchange (PBX) service provider;
identifying a click-to-call request parameter associated with the click-to-call request;
detecting a number of previous click-to-call requests associated with the click-to-call request parameter during a first time period, the number exceeding a first predetermined threshold; and
denying the click-to-call request from the user and any future click-to-call request associated with the click-to-call parameter for a second predetermined time period.

16. The system of claim 15, wherein the number of previous click-to-call requests associated with the click-to-call request parameter is determined on an account level of the targeted subscriber account, and the first predetermined threshold is specified in an account-specific policy of the targeted subscriber account.

17. The system of claim 16, wherein denying the click-to-call request further comprises:
determining a current state of the targeted subscriber account at a time of the click-to-call request, the current state being one of a warning state, a blocked state, or a normal state; and
if the current state is the warning state,
presenting a challenge to the user; and
denying the click-to-call request if the user fails the challenge;
if the current state is the blocked state,
denying the click-to-call request if the second time period has not expired at the time of the click-to-call request;
if the current state is the normal state,
changing the current state to the warning state;
presenting a challenge to the user; and
denying the click-to-call request if the user fails the challenge.

18. The system of claim 16, wherein before the detecting and the denying, the operations further comprise determining a second number of previous click-to-call requests associated with the click-to-call request parameter on a system level of the virtual PBX service provider during a third predetermined time period and verifying that the second number does not exceed a second predetermined threshold that is specified in a system policy of the virtual PBX service provider.

19. The system of claim 15, wherein the click-to-call parameter is an Internet Protocol (IP) address of the user.

20. The system of claim 15, wherein the click-to-call parameter is a callback telephone number of the user.

21. The system of claim 15, wherein the number of previous click-to-call requests associated with the click-to-call request parameter is determined on a system-level of the virtual PBX service provider, and the first predetermined threshold is specified in a system policy of the virtual PBX service provider.

* * * * *